United States Patent
Vijayan et al.

(10) Patent No.: US 10,563,543 B2
(45) Date of Patent: Feb. 18, 2020

(54) EXHAUST DIFFUSER

(71) Applicant: General Electric Company, Schenectady, NY (US)

(72) Inventors: Santhosh Kumar Vijayan, Karnataka (IN); Deepesh Dinesh Nanda, Karnataka (IN); Manjunath Bangalore Chengappa, Karnataka (IN)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 15/168,400

(22) Filed: May 31, 2016

(65) Prior Publication Data
US 2017/0342862 A1 Nov. 30, 2017

(51) Int. Cl.
F01D 25/30 (2006.01)
F01D 9/02 (2006.01)
F01D 25/24 (2006.01)
F02K 1/04 (2006.01)
F01D 5/14 (2006.01)

(52) U.S. Cl.
CPC .............. F01D 25/30 (2013.01); F01D 9/02 (2013.01); F01D 25/24 (2013.01); F02K 1/04 (2013.01); F01D 5/145 (2013.01); F05D 2220/32 (2013.01); F05D 2260/60 (2013.01)

(58) Field of Classification Search
CPC . F01D 9/02; F01D 25/24; F01D 25/30; F02K 1/04; F05D 2250/52
See application file for complete search history.

(56) References Cited

U.S. PATENT DOCUMENTS

| | | | | |
|---|---|---|---|---|
| 4,802,821 | A * | 2/1989 | Krietmeier | F01D 25/30 415/208.2 |
| 4,920,742 | A * | 5/1990 | Nash | F01D 25/162 415/116 |
| 6,866,479 | B2 | 3/2005 | Ishizaka et al. | |
| 2010/0071342 | A1 | 3/2010 | Siden et al. | |
| 2011/0088379 | A1 | 4/2011 | Nanda | |
| 2011/0088398 | A1 | 4/2011 | Subbarao et al. | |
| 2012/0034064 | A1 | 2/2012 | Nanda et al. | |
| 2012/0045324 | A1 | 2/2012 | Siden et al. | |
| 2012/0198810 | A1 | 8/2012 | Ansari et al. | |
| 2013/0081731 | A1 | 4/2013 | Nanda et al. | |
| 2013/0091865 | A1 | 4/2013 | Nanda et al. | |
| 2013/0129498 | A1* | 5/2013 | Hofmann | F01D 1/02 415/211.2 |
| 2013/0170969 | A1 | 7/2013 | Subramaniyan et al. | |
| 2013/0180246 | A1 | 7/2013 | Nanda et al. | |
| 2013/0189088 | A1 | 7/2013 | Nanda et al. | |
| 2014/0096500 | A1 | 4/2014 | Chengappa et al. | |
| 2014/0137533 | A1 | 5/2014 | Subramaniyan et al. | |
| 2014/0142899 | A1 | 5/2014 | Nanda | |
| 2014/0161603 | A1 | 6/2014 | Chouhan et al. | |
| 2014/0178191 | A1 | 6/2014 | Vijayan et al. | |

(Continued)

Primary Examiner — Justin D Seabe
Assistant Examiner — Christopher R Legendre
(74) Attorney, Agent, or Firm — Eversheds Sutherland (US) LLP

(57) ABSTRACT

The present disclosure provides an exhaust diffuser for a gas turbine engine. The exhaust diffuser may include a hub, a casing, and a strut extending between the hub and the casing. The hub may include an angled configuration about the strut and a substantially flat configuration downstream of the angled configuration.

19 Claims, 3 Drawing Sheets

(56) References Cited

U.S. PATENT DOCUMENTS

2014/0271168 A1    9/2014  Lopez-Parra et al.
2015/0016982 A1*   1/2015  Hofmann ................ F01D 25/30
                                                    415/207
2015/0240667 A1    8/2015  Nanda et al.
2017/0342862 A1*  11/2017  Vijayan ..................... F01D 9/02

* cited by examiner

EXHAUST DIFFUSER

TECHNICAL FIELD

The present application and the resultant patent relate generally to gas turbine engines and more particularly relate to exhaust diffusers for use with gas turbine engines and the like with reduced turbulence and reduced flow losses.

BACKGROUND OF THE INVENTION

Gas turbine engines generally include an exhaust diffuser positioned downstream of the last stage of a turbine. Generally described, the exhaust diffuser converts the kinetic energy of the hot combustion gases exiting the last stage of the turbine into potential energy in the form of increased static pressure. The exhaust diffuser directs the hot combustion gases through a casing of increasing cross-sectional area in the direction of the flow. The exhaust diffuser generally includes a number of struts mounted onto a hub and enclosed by the casing.

The first section of the exhaust diffuser may account for a majority of the pressure recovery at all load points. The struts in this section, however, may create turbulence and flow losses, particularly if the struts or the bucket platform is flared forward. Hub strong inlet flow profiles also may contribute to the flow losses in that such profiles may concentrate a large amount of the hot combustion gas flow near the hub flow path with separation from the casing.

SUMMARY OF THE INVENTION

The present application and the resultant patent thus provide an exhaust diffuser for a gas turbine engine. The exhaust diffuser may include a hub, a casing, and a strut extending between the hub and the casing. The hub may include an angled configuration about the strut and a substantially flat configuration downstream of the angled configuration.

The present application and the resultant patent further provide an exhaust diffuser for a gas turbine engine. The exhaust diffuser may include a hub, a casing, a strut extending between the hub and the casing, and an inlet. The hub may include an angled configuration extending downstream of the inlet to the strut and a substantially flat configuration downstream of the angled configuration.

The present application and the resultant patent further provide an exhaust diffuser for a gas turbine engine. The exhaust diffuser may include a hub, a casing, a strut extending between the hub and the casing, and an inlet. The hub may include an angled configuration extending downstream of the inlet to about the strut and a substantially flat configuration downstream of the angled configuration.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
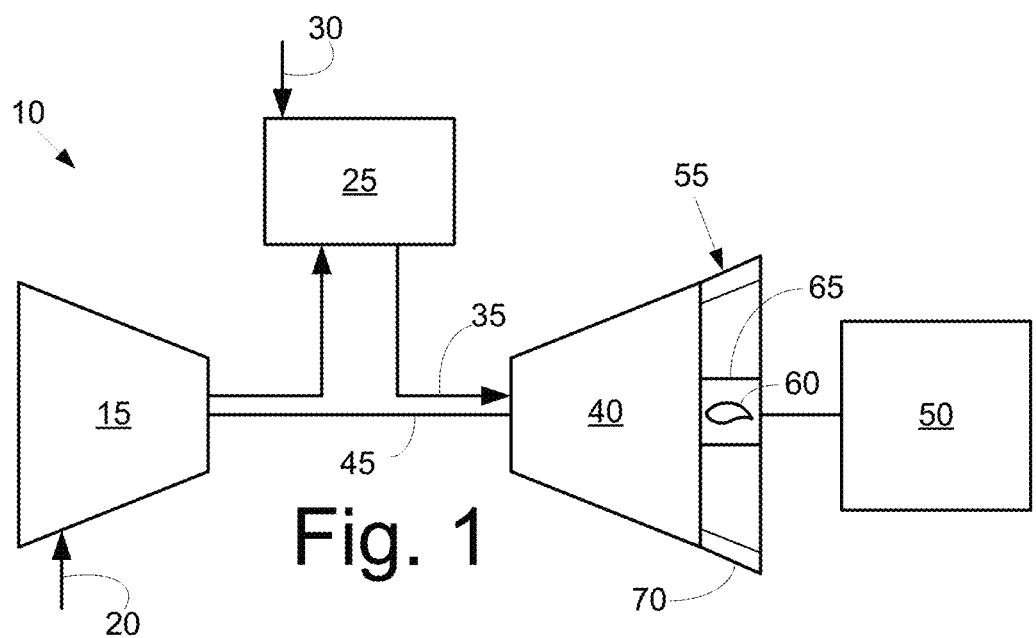
FIG. 1 is a schematic diagram of a gas turbine engine with a compressor, a combustor, a turbine, a diffuser, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 configured in a circumferential array and the like. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
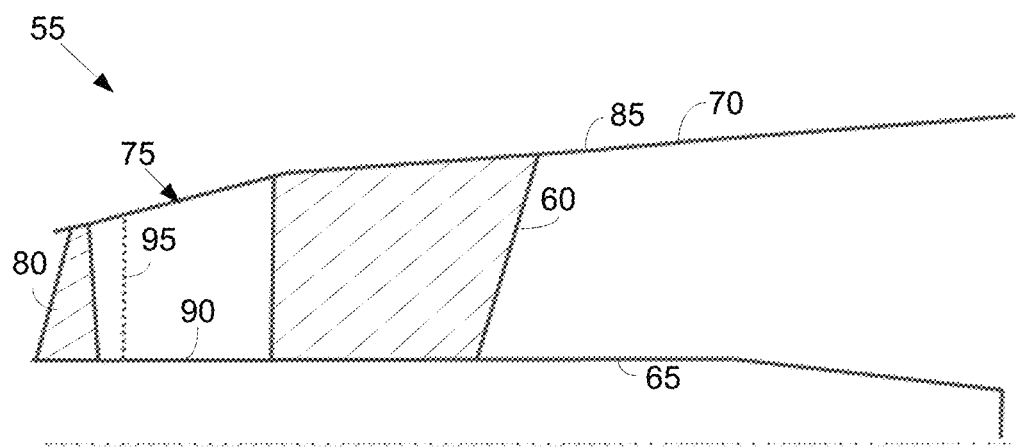
FIG. 2 is a partial schematic view of a known diffuser that may be used with the gas turbine engine of FIG. 1.

As is shown in FIGS. 1 and 2, the gas turbine engine 10 also may include an exhaust diffuser 55. The exhaust diffuser 55 may be positioned downstream of and in communication with the turbine 40. As described above, the exhaust diffuser 55 may include a number of struts 60 mounted on a hub 65 and enclosed within an outer casing 70. The struts 50 serve to hold the hub 65 and the casing 70 in a fixed relationship to one another. The exhaust diffuser 55 may turn the flow of the combustion gases 35 in a radial direction. An upstream section 75 of the exhaust diffuser 55 may be positioned adjacent to a last stage bucket 80 of the turbine 40. The casing 70 about the upstream section 75 may have an angled casing configuration 85 while the hub 65 about the upstream section 75 may have a substantially flat hub configuration. The substantially flat hub configuration 90 may be largely parallel to the direction of the shaft 45 and largely perpendicular to a radial line 95 therethrough. Other configurations and other components may be used.

Figure 3:
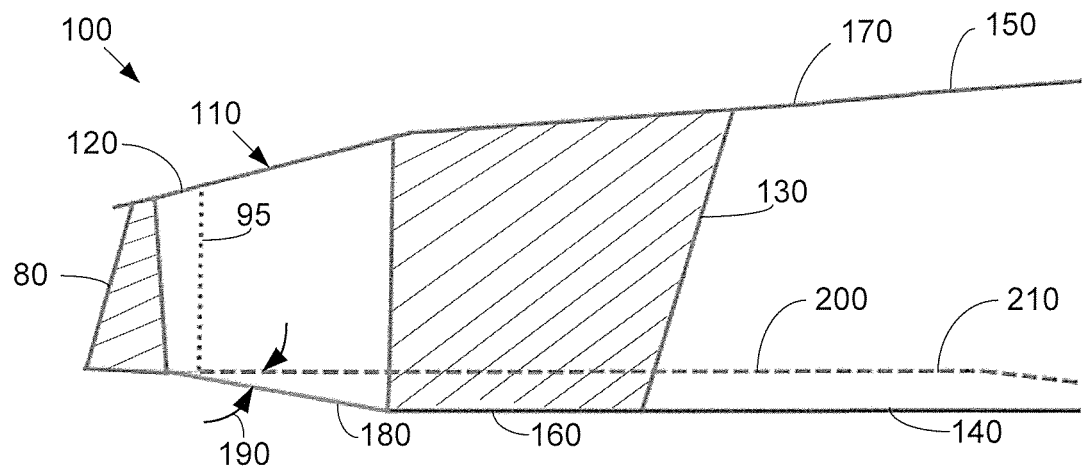
FIG. 3 is a partial schematic view of an exhaust diffuser as may be described herein.

FIG. 3 shows a portion of an exhaust diffuser 100 as may be described herein. Specifically, an upstream section 110 of the exhaust diffuser 100 is shown. The upstream section 110 may have an inlet 120 positioned about the last stage bucket 80 of the turbine 40. The exhaust diffuser 100 may include a number of struts 130 mounted on a hub 140 and enclosed within an outer casing 150. Any number of struts 130 may be used herein. In this example, the struts 130 may have a forward position 160 closer to the inlet 110. In other words, the struts 130 may be positioned closer to the inlet 120 of the first section 110 and the last stage bucket 80 than the typical configuration discussed above given that moving the strut 130 forward generally contributes to turbulence and flow losses.

The outer casing 150 may have an angled casing configuration 170 similar to that described above. In this example, the hub 140 about the upstream section 110 may include an angled hub configuration 180. The angled hub configuration 180 may be angled downwardly from about the inlet 120 of the upstream section 110 to about the strut 130. Other lengths may be used herein. The angled hub configuration 180 may include a hub angle 190. Specifically, the hub angle 190 may extend downward from a hub line 200 that is substantially perpendicular to the radial line 95. The hub angle 190 may extend to about six degrees (6°) or less although other angles may be used herein. The hub 140 then may continue in a substantially flat hub configuration 210 downstream of the angled hub configuration 180 and the strut 130 along the hub line 200. Other components and other configurations may be used herein.

The use of the hub angle 190 may optimize the exhaust diffuser 100 for hub strong flow profiles so as to increase overall diffuser performance. Moreover, the hub angle 190 also allows the struts 130 to be moved forward without creating the increase in turbulence and flow losses described above. Larger turbine flare angles also may be provided about the hub 140. By contrast, increasing the angle of the casing 150 instead of the hub angle 190 may increase the shipping limit so as to make the diffuser overly susceptible to flow separation. The use of the hub angle 190 thus may maintain overall performance at full speed, full load conditions while increasing performance at partial loads and the like.

Figure 4:
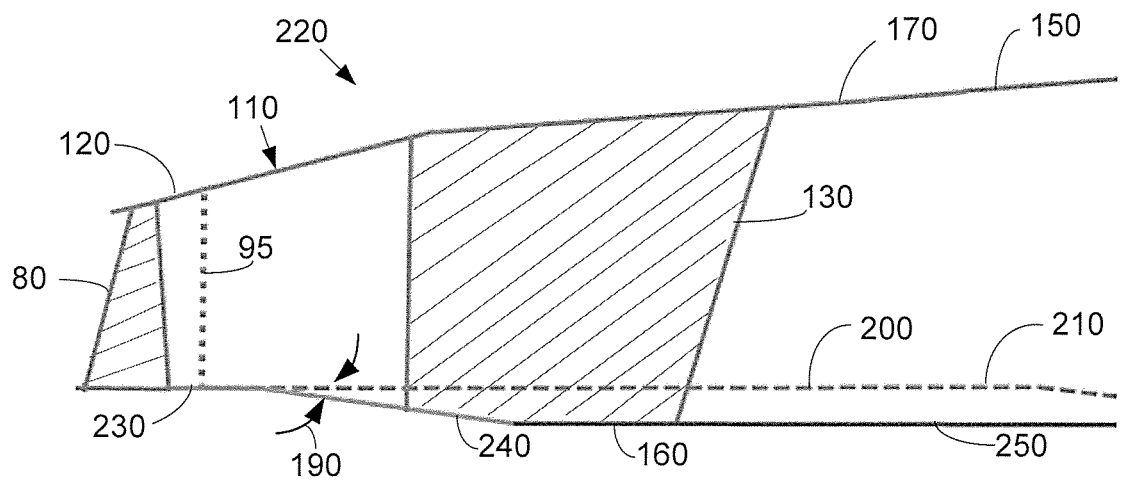
FIG. 4 is a partial schematic view of an alternative embodiment of an exhaust diffuser as may be described herein.

FIG. 4 shows an example of an alternative embodiment of an exhaust diffuser 220 as may be described herein. In this example, the hub 140 may have the substantially flat hub configuration 210 in the form of a first flat length 230. The first flat length 230 may extend from about the inlet 120 of the upstream section 110 along the hub line 200. Other lengths may be used herein. The hub 140 then may have the angled hub configuration 180 in the form of an angled hub length 240. The angled hub length 240 may extend from the first flat length 230 upstream of the strut 130 to a point along the length of the strut 130. Other lengths may be used herein. The angled hub length 240 may include the hub angle 190. The hub angle 190 may be the same or similar to that described above. The hub 140 then may continue in the substantially flat hub configuration 210 in the form of a second flat length 250. The second flat length 250 may continue downstream along the hub line 200. Other components and other configurations may be used herein.

Figure 5:
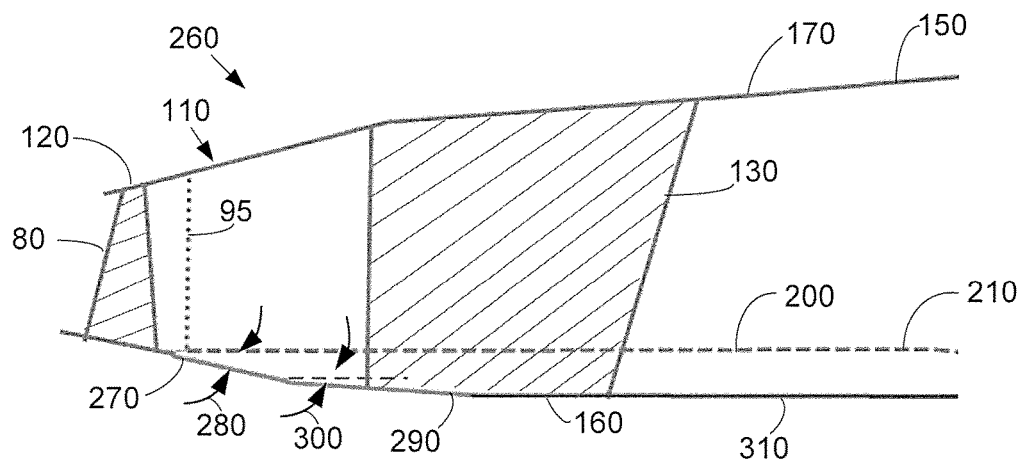
FIG. 5 is a partial schematic view of an alternative embodiment of an exhaust diffuser as may be described herein.

FIG. 5 shows a further embodiment of an exhaust diffuser 260 as may be described herein. In this example, the hub 140 may have the angled hub configuration 180 in the form of a first angled hub length 270. The first angled hub length 270 may extend from about the inlet 120 to a point upstream of the strut 130. Other lengths may be used herein. The first angled hub length 270 may have a first hub angle 280. The first hub angle 280 may vary. The hub 140 then may have a second angled hub length 290. The second angled hub length 290 may extend from the first angled hub length 270 upstream of the strut 130 to a point along the length of the strut 130. Other lengths may be used herein. The second angled hub length 290 may have a second hub angle 300. The second hub angle 300 may vary. The hub 140 then may continue in the substantially flat hub configuration 210 in the form of a hub flat length 310 extending from the second angled hub length 290 along the hub line 200 downstream thereof. Other components and other configurations may be used herein.

Figure 6:
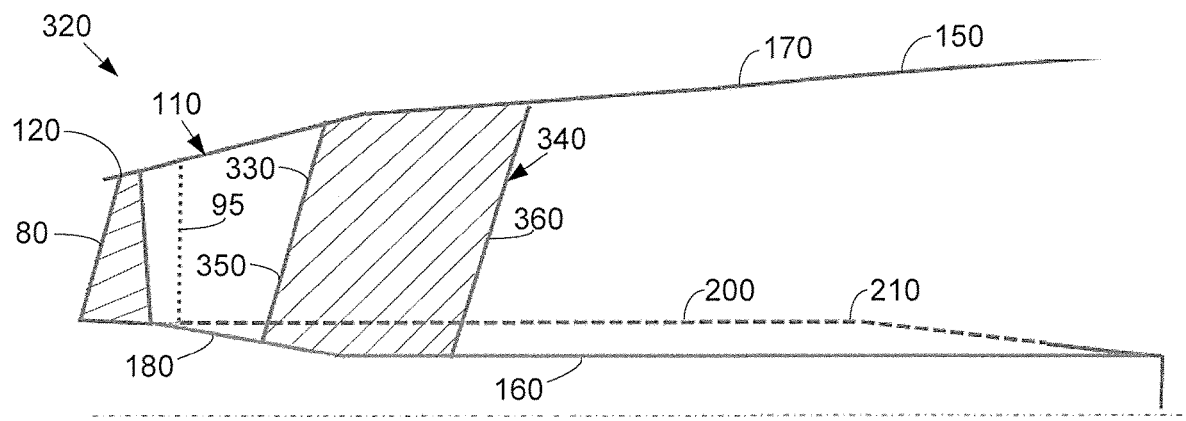
FIG. 6 is a partial schematic view of an alternative embodiment of an exhaust diffuser as may be described herein.

FIG. 6 shows an example of an alternative embodiment of an exhaust diffuser 320 as may be described herein. In a manner similar to that of FIG. 3, the hub 140 about the upstream section 110 may include the angled hub configuration 180. The angled hub configuration 180 may be angled downwardly from about the inlet 120 of the upstream section 110 to along the strut. Other lengths may be used herein. The angled hub configuration 180 may include the hub angle 190. Specifically, the hub angle 190 may extend downward from the hub line 200 that is substantially perpendicular to the radial line 95. The hub angle 190 may extend to about six degrees (6°) or less although other angles may be used herein. The hub 140 then may continue in the substantially flat hub configuration 210 downstream of the angled hub configuration 180 along the hub line 200. Other components and other configurations may be used herein.

Instead of the struts 130 described above with a leading edge 330 being largely parallel to the radial line 95 and largely perpendicular to the hub line 200, a strut 340 in this example may have the leading edge 330 with a forward angle 350. Specifically, the leading edge 330 may be closer to the last stage bucket 80 about the hub 140 as compared to about the casing 150 along a substantially straight line. Differing angles may be used herein. The strut 340 also may have a trailing edge 360 with the same or a similar forward angle 350. Alternatively, the trailing edge 360 may be largely perpendicular to the hub line 200 or in any suitable configuration. Other components and other configurations may be used herein.

The strut 340 with the forward angle 350 may be used with any of the exhaust diffuser examples described herein and the like. The use of the forward angle 350, as well as the forward position 160, reduces blockage and flow loses caused by the struts by reducing resistance thereto.

The various angled hub configurations, strut configurations, and the like described herein are for the purpose of example only. Different configurations and combinations thereof may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An exhaust diffuser for a gas turbine engine with a shaft that drives a load, comprising:
   a hub;
   a casing; and
   a strut extending between the hub and the casing;
   the hub comprising an angled configuration adjacent to or along a portion of the strut and a flat configuration downstream of the angled configuration;
   wherein the angled configuration extends downstream in a radially inward direction towards the shaft, and wherein the flat configuration extends parallel to and along the shaft.

2. The exhaust diffuser of claim 1, wherein the angled configuration of the hub is axially coincident with an upstream section of the exhaust diffuser.

3. The exhaust diffuser of claim 1, wherein the angled configuration of the hub is axially coincident with an inlet of the exhaust diffuser.

4. The exhaust diffuser of claim 3, wherein the angled configuration of the hub begins at the inlet and extends to the strut.

5. The exhaust diffuser of claim 3, wherein the angled configuration of the hub begins downstream of the inlet and extends to be axially coincident with the strut.

6. The exhaust diffuser of claim 1, further comprising a flat inlet configuration of the hub that is axially coincident with and extends downstream of an inlet of the exhaust diffuser.

7. The exhaust diffuser of claim 1, wherein the angled configuration of the hub comprises a first angled hub length with a first hub angle.

8. The exhaust diffuser of claim 7, wherein the angled configuration of the hub comprises a second angled hub length with a second hub angle.

9. The exhaust diffuser of claim 1, wherein the strut is axially coincident with the flat configuration of the hub.

10. The exhaust diffuser of claim 1, wherein the strut is axially coincident with the angled configuration of the hub in part and the flat configuration of the hub in part.

11. The exhaust diffuser of claim 1, wherein the strut is at a forward position of the exhaust diffuser.

12. The exhaust diffuser of claim 1, wherein a leading edge of the strut comprises a forward angle.

13. The exhaust diffuser of claim 1, wherein the casing comprises an angled casing configuration.

14. An exhaust diffuser for a gas turbine engine with a shaft that drives a load, comprising:
a hub;
a casing;
a strut extending between the hub and the casing; and
an inlet;
the hub comprising an angled configuration extending downstream of the inlet and to the strut and a flat configuration downstream of the angled configuration;
wherein the angled configuration extends downstream in a radially inward direction towards the shaft, and wherein the flat configuration extends parallel to and along the shaft.

15. The exhaust diffuser of claim 14, wherein the strut is axially coincident with the flat configuration of the hub.

16. The exhaust diffuser of claim 15, wherein the strut is axially coincident with the angled configuration of the hub in part and the flat configuration of the hub in part.

17. An exhaust diffuser for a gas turbine engine with a shaft that drives a load, comprising:
a hub;
a casing;
a strut extending between the hub and the casing; and
an inlet;
the hub comprising an angled configuration extending downstream of the inlet to adjacent to the strut and a flat configuration downstream of the angled configuration;
wherein the angled configuration extends downstream in a radially inward direction towards the shaft, and wherein the flat configuration extends parallel to and along the shaft.

18. The exhaust diffuser of claim 17, wherein the angled configuration of the hub comprises a first angled hub length with a first hub angle.

19. The exhaust diffuser of claim 18, wherein the angled configuration of the hub comprises a second angled hub length with a second hub angle.

* * * * *